United States Patent
Wen et al.

(10) Patent No.: US 6,367,258 B1
(45) Date of Patent: Apr. 9, 2002

(54) METHOD AND APPARATUS FOR VAPORIZING LIQUID NATURAL GAS IN A COMBINED CYCLE POWER PLANT

(75) Inventors: Harvey Wen, Potomac; Ram G. Narula, Gaithersburg, both of MD (US)

(73) Assignee: Bechtel Corporation, Houston, TX (US)

( * ) Notice: Subject to any disclaimer, the term of this patent is extended or adjusted under 35 U.S.C. 154(b) by 0 days.

(21) Appl. No.: 09/620,822

(22) Filed: Jul. 21, 2000

Related U.S. Application Data

(60) Provisional application No. 60/145,336, filed on Jul. 23, 1999, and provisional application No. 60/145,034, filed on Jul. 22, 1999.

(51) Int. Cl.[7] ............................................... F03G 7/04
(52) U.S. Cl. ..................................... 60/641.7; 60/641.1
(58) Field of Search .......................... 60/39.02, 39.182, 60/39.465, 728, 641.6, 641.7, 641.1, 670

(56) References Cited

U.S. PATENT DOCUMENTS

| | | | |
|---|---|---|---|
| 3,978,663 A | * 9/1976 | Mandrin et al. | ............... 60/728 |
| 5,295,350 A | * 3/1994 | Child et al. | ............... 60/728 X |
| 5,400,588 A | 3/1995 | Yamane et al. | ........... 60/39.465 |
| 5,457,951 A | 10/1995 | Johnson et al. | ............. 60/39.02 |
| 5,626,019 A | 5/1997 | Shimizu et al. | ................ 60/728 |
| 5,806,298 A | 9/1998 | Klosek et al. | ............. 60/39.06 |
| 6,089,022 A | * 7/2000 | Zednik et al. | ............. 60/641.7 |
| 6,164,247 A | * 12/2000 | Iwasaki et al. | ........ 60/641.7 X |

* cited by examiner

*Primary Examiner*—Hoang Nguyen
(74) *Attorney, Agent, or Firm*—Madan, Mossman & Sriram PC

(57) ABSTRACT

A method and apparatus for increasing the efficiency of a combined cycle generation plant by assisting the vaporization of cold liquid including liquefied natural gas ("LNG") or liquefied petroleum gas (LPG) in a combined cycle power plant. Cold liquid vaporization is assisted by circulating a warm heat transfer fluid to transfer heat to a LNG/LPG vaporizer. The heat transfer fluid is chilled by LNG/LPG cold liquid vaporization and warmed by heat from a gas turbine. The heat transfer fluid absorbs heat from the air intake of a gas turbine and from a secondary heat transfer fluid circulating in a combined cycle power plant. Chilling the gas turbine air intake densifies the air and increases the gas turbine output. Chilling the steam condenser cooling water increases steam turbine output. The effects of chill recovery is higher output and better efficiency of the combined cycle plant.

19 Claims, 3 Drawing Sheets

METHOD AND APPARATUS FOR VAPORIZING LIQUID NATURAL GAS IN A COMBINED CYCLE POWER PLANT

CROSS REFERENCE TO RELATED APPLICATIONS

This patent application claims priority from U.S. provisional applications serial No. 60/145,336 by H. Wen and R. Narula filed Jul. 23, 1999 entitled "Method and Apparatus for Vaporizing Liquid Natural Gas in a Combined Cycle Power Plant" and Ser. No. 60/145,034 by H. Wen and R. Narula filed Jul. 22, 1999 entitled "Chill Recovery From Cold Liquid for Power Generation."

BACKGROUND OF THE INVENTION

1. Field of the Invention

The present invention relates generally to a method and apparatus for improving the output and efficiency of a combined cycle power generation plant and in particular to an improved method and apparatus for producing power by circulating a primary heat transfer fluid in a combined cycle power plant using Liquefied Natural Gas ("LNG") or Liquefied Petroleum Gas ("LPG") as a gas turbine fuel, utilizing cold energy associated with the vaporization to chill inlet air to the gas turbine, thereby increasing the efficiency of the gas turbine. During low ambient temperature conditions, when chilling of the gas turbine inlet air is not required, the LNG/LPG cold energy is used to cool the steam turbine condenser cooling water (secondary heat transfer fluid) to increasing the steam turbine efficiency and output.

2. Description of the Related Art

Combined cycle power plants use both steam and gas turbines to generate power. These combined cycle gas/steam power plants generally have produced a higher energy conversion efficiency than gas or steam only plants. The combined cycle plant's efficiencies from 50% to 60%. These higher combined cycle efficiencies result from synergistic utilization of the combination of the gas turbine(s) with the steam turbine(s). Typically, combined cycle power plants utilize heat from the gas turbine exhaust to boil water to generate steam. These typical combined cycle plants are referred to as heat recovery steam generator (HRSG). The steam generated is utilized to power a steam turbine in the combined cycle plant. The gas turbine and the steam turbine can be utilized to separately power independent generators, or in the alternative, the steam turbine can be combined with the gas turbine to jointly drive a single generator via a common drive shaft.

LNG has been been utilized in combined cycle power plants as a fuel for the gas turbines. The advent of larger and more reliable gas turbines for generator drivers has been a key factor for increasing utilization of LNG as a power generation fuel for such gas turbines. Gas turbines can generate high volumes of heated exhaust gases. These heated gases can then be utilized to boil water and generate steam in a HRSG. The steam generated from the heated gas turbine exhaust is then used to drive a steam turbine, which in turn drives another power generator.

Combined cycle generation plant manifest various different arrangements and configurations. The thermal efficiency of a combined cycle generation plant, however, can approach 60% as compared to the thermal efficiency range of only 38 to 41% for a conventional steam turbine only power generation plant without a combined steam and gas turbine.

Gas fuel supply, however, has been a problem for the combined cycle power generation plants. LNG/LPG gas liquefaction, transportation, unloading, storage, vaporization, and utilization for power generation and/or feeding the existing pipelines is a major undertaking entailing hundreds of millions of dollars in capital investments. Because of these higher capital costs, LNG has typically been economically viable only for largest pipelines and power generation projects.

One feasible scenario is the "integrated energy" approach. The integrated energy approach entails developing a single integrated project including all the steps from generating natural gas fuel via LNG liquefaction all the way through burning the fuel for power generation. The integrated energy approach has proven to be superior to sequentially developing independent projects along the energy supply line. Thus, the integrated energy approach is emerging as the preferred method because of its significantly lower project development and installation costs.

Privatization of the energy and infrastructure sectors in many developing countries is another factor in the growing utilization of LNG for power generation in combined cycle power generation plants. Millions of dollars can be saved in project development and construction costs by integrating the design, procurement, and construction of LNG/LPG receiving terminals with a combined cycle power generation plant utilizing LNG/LPG as a fuel supply. Some of the factors contributing to these huge savings include the optimization of LNG/LPG vaporization cold energy capture and utilization; optimization of the LNG/LPG combined cycle plant facility layout based on safety and energy efficient design considerations; integration of fuel unloading piers with water intake and discharge structures; integration of site development plans; utilization of common facilities for fire fighting, cooling water, electrical systems, administration and warehouse facilities; use of common non-manual construction staff; and finally integration of the construction schedules.

Moreover, with the increased demand for cleaner fuels, LNG now plays an even greater role in power generation, especially in countries that have to import natural gas. Since a great deal of energy is required to liquefy natural gas, an efficient capture of LNG cold energy associated with LNG vaporization can significantly improve a combined cycle power plant project's cost effectiveness. The cold can be used to chill and densify intake air to the gas turbines and to cool steam turbine condenser cooling water to increase their efficiencies. The combined cycle plants provide higher efficiency than conventional steam power plants, however, a significant amount of energy is wasted. Typically energy is wasted that is generated in the form of heat from the combined cycle plant steam turbine condensers, heat from air passing into the gas turbine and cold energy generated during LNG vaporization. Thus there is a need to capture this heat and cold energy which is a by-product of the combine cycle power generation plants using LNG/LPG.

There is also a need to utilize LNG cold energy generated during LNG vaporization for chilling the air supply to a gas turbines and to cool condenser water to increase the output and efficiency of a combined cycle power plant. Thus, there is a need for a method and apparatus for increasing the output and efficiency of a combined cycle power plant by efficiently capturing heat and cold energy generated during combined cycle power generation.

SUMMARY OF THE INVENTION

The present invention meets the above mentioned needs by providing a method and apparatus for improving the output and efficiency of a combined cycle power generation plant by capturing heat generated in the power generation process to assist in the vaporization of LNG or LPG. Heat is recycled by circulating a warm primary heat transfer fluid through a vaporization heat exchanger associated with LNG/LPG vaporization process. The primary heat transfer fluid provides the heat for LNG/LPG vaporization. The present invention provides a heat transfer fluid which circulates to chill and densify inlet air passing through a gas turbine air intake. Chilling the gas turbine inlet air densities the inlet air and makes the gas turbine more efficient. Cooling the steam condenser cooling water increases steam turbine output. By removing heat from the gas turbine inlet air and/or from steam condenser cooling water, the plant output and efficiency is increased in a combined cycle power plant.

DETAILED DESCRIPTION OF A PREFERRED EMBODIMENT

Figure 1:
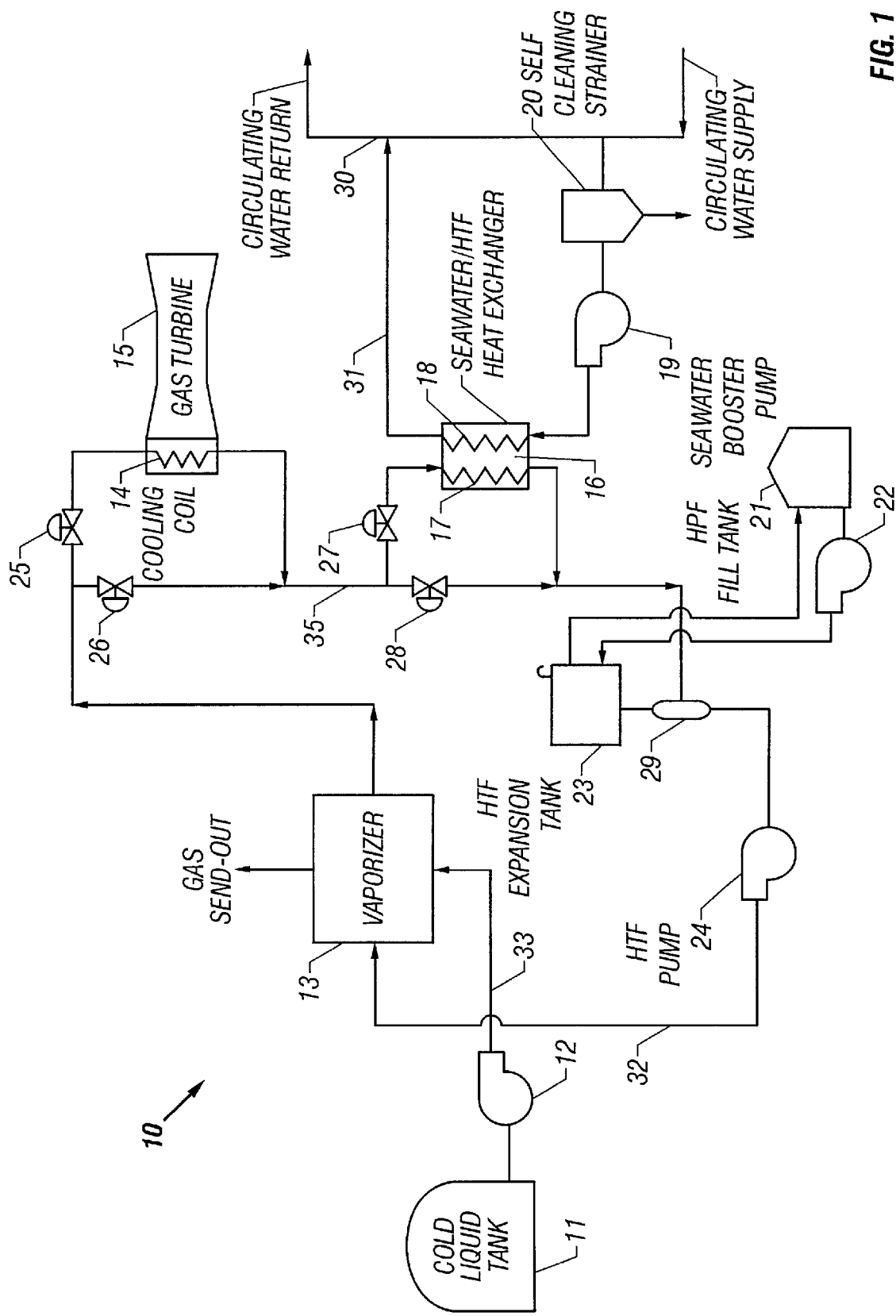
FIG. 1 is a block diagram of a combined cycle power generation plant in a preferred embodiment of the present invention.

In a preferred embodiment, the cold energy generated during LNG/LPG vaporization is transferred to a primary heat transfer fluid to chill inlet air in a gas turbine as a means for increasing the efficiency and the power output of a gas turbine. Lowering the temperature of the gas turbine inlet air densifies the inlet air and increases the gas turbine efficiency and thus increases the power output of the gas turbine. The cold energy generated during LNG/LPG vaporization is transferred to the heat transfer fluid and utilized to chill the inlet air input to the gas turbine.

In a preferred embodiment, a primary heat transfer fluid is heated by absorbing heat from gas turbine inlet air. In an alternative embodiment, a primary heat transfer fluid is heated from steam condenser cooling water. The LNG gas or vapor is preferably utilized as a fuel in the gas turbine or shipped out for distribution as natural gas.

There are a number of different well known apparatuses available for LNG vaporization. These LNG vaporizer apparatus include, but are not limited to submerged combustion vaporizers (SCV), open rack vaporizers (ORV), and closed loop shell-and-tube vaporization heat exchangers. In an SCV, the LNG is vaporized in a bath of hot water. The water bath is heated indirectly by combusting natural gas. The maximum water bath temperature is preferably 40° C. Since natural gas is burned to provide the heat source for the water bath, the SCV expends LNG fuel, thereby decreasing plant efficiency. Thus, SCV are not preferred because they are less efficient that the ORV.

The ORV typically uses seawater as a heat source to help vaporize LNG. An ORV consists of two horizontal headers connected by a series of vertical tubes. The LNG enters the bottom header and moves up through the vertical tubes to the second horizontal header. Vaporized LNG is then collected as natural gas in the ORV and removed from the top header.

The closed loop shell and tube exchanger is preferable for LNG chill recovery because of consistent cost effectiveness and efficiency over a wide range of operating temperatures and pressures. Various heating media can be utilized as a heat exchange media to provide a heat source for vaporization. These heating media include seawater, low pressure steam and glycol/water systems. Although low pressure steam from a combined cycle power plant is an acceptable heat source for LNG/LPG vaporization, an alternate steam generation source such as an auxiliary boiler may be utilized during system startup.

Preferably, a combination of glycol and water is used as the heat transfer fluid in conjunction with a gas fired heater. The glycol and water combination is preferred because it can operate over a wide range of temperatures and pressures. Typically, two methods can be utilized to vaporize liquefied hydrocarbons such as LNG and LPG, the high-pressure and low-pressure methods. In the high-pressure method, the liquid hydrocarbons (LNG/LPG) are pumped to a desired pressure and then heated to vaporize the liquid hydrocarbons. In the low-pressure liquid hydrocarbon vaporization method, the liquid hydrocarbons are vaporized and then compressed to a desired pressure.

In a preferred embodiment, during LNG vaporization and chill recovery, the high-pressure method is preferred for light hydrocarbon vaporization such as LNG. As the molecular weight of the hydrocarbon increases, the lower pressure method becomes more preferred. For example, for use by advanced gas turbines, natural gas is pressurized to approximately 35 bars or higher. When the high pressure method is used to vaporize LNG, the LNG is removed from the storage tank by in-tank submerged pumps. A second pump then pumps the LNG from the submerged pumps to a pressure of 35 bars or higher. The LNG is then vaporized and heated to approximately 4° C. by one of the vaporization devices described above.

When the low-pressure vaporization method is used, the LNG is removed from the storage tank by pumps submerged in the tanks. LNG is then vaporized and heated to approximately 4° C. The gas is then compressed to 35 bars. The heat of vaporization is slightly higher for the low-pressure method (approximately 6 percent) than that for the high-pressure method. Also, in the low-pressure method, the fuel temperature at the gas turbine inlet is higher (116° C.), compared with 4° C. of the high-pressure method. However, there is a significant difference in the auxiliary power requirements of the two methods. The high-pressure method requires less than 3 percent of the power needed for the low-pressure method. The increase in plant power output in low-pressure method over the high-pressure method is due to higher degree of LNG cold energy utilization and a higher fuel temperature is insignificant compared to the corresponding increase in the auxiliary load requirements. Therefore, because of the better overall performance and lower capital cost, the high-pressure method is the preferred method for vaporizing LNG.

A number of options are also available for using LNG vaporization cold energy and heat recovery in a combined cycle power generation plant. The following is a brief description of some of the options that are available to integrate LNG cold energy utilization into the operations of a combined cycle power generation plant. One option is to use LNG vaporization cold energy to chill circulation water at the steam condenser inlet to assist in condensing steam, thereby improving the plant net power output and heat rate. However, this output improvement is less significant compared to the increased output available by using LNG vaporization cold energy to chill inlet air for a gas turbine. This is due, in part, to the fact that LNG vaporization cold energy for a typical advanced gas turbine based combined cycle power plant represents only 3 percent of the condenser cooling duty cycle. Alternatively, LNG vaporization cold energy can be utilized to cool warm circulating water output from a steam condenser discharge leg.

A second LNG vaporization cold energy utilization option is the cryogenic power generation option, utilizing an organic Rankine cycle which operates as a heat engine to generate power using the heat from a steam turbine exhaust and the LNG vaporization cold energy. Typically, propane or butane is utilized as the working fluid in this cycle. Propane is liquefied using the LNG cold. The liquefied propane is then pressurized and vaporized utilizing the steam turbine exhaust. The pressurized propane gas is then expanded to generate power.

A third and the preferred LNG cold energy utilization option, the gas turbine combustion cooling option uses the LNG cold energy to increase the power output and efficiency of a gas turbine by cooling the inlet air to a gas turbine in the a combined cycle power plant. The degree of improvement in power output and efficiency depends upon the ambient temperature and relative humidity at the power plant and the amount of LNG readily available for vaporization.

For a multipurpose LNG receiving terminal, the amount of LNG vaporized may be more than needed as a fuel for the gas turbines in the combined cycle power plant. The LNG vaporization cold energy can be used to improve power plant condenser performance, cryogenic power generation, and to chill inlet air to the gas turbine to increase efficiency.

In a preferred embodiment, a working fluid or primary heat transfer fluid such as water or a mixture of glycol/water is used to transfer the LNG vaporization cold energy from the LNG vaporizer to the cooling coils at a gas turbine air inlet. In a preferred embodiment, a tube and shell closed loop vaporizer is utilized with the glycol/water mixture. In an alternative embodiment, the LNG cold utilization system integrates an open rack vaporizer using freshwater as the circulating heat transfer fluid. Power plant site ambient conditions significantly affect the performance and efficiency of the LNG cold utilization process. Plant sites having a high seasonal dry bulb temperature and a low wet bulb temperature are more suitable for LNG cold utilization. Wet bulb temperature directly affects how effectively the gas turbines inlet air is cooled. If the site has a high wet bulb temperature, e.g., a very humid climate, a large portion of the recovered LNG vaporization cold energy is used to condense moisture from the air.

In a preferred embodiment of the present invention a gas turbine power output is increased by chilling a circulating primary heat transfer fluid to remove heat from the inlet air to the gas turbine air compressor. The cold liquids used in a preferred embodiment comprise LNG, LPG, and ethylene. LPG includes ethane, propane, and butane.

Turning now to FIG. 1, a preferred embodiment of the present invention is presented. As shown in FIG. 1, an apparatus 10 for improving the output/efficiency of a combined cycle generation plant is depicted. As shown, a cold liquid 33 (e.g., LNG or LPG) is pumped by pump 12 from a cold storage tank 11 to a vaporizer 13 where the cold liquid is vaporized. LNG vaporization is accomplished by the LNG being in heat transfer relationship with a heated primary heat transfer fluid 32 and absorbing heat from the warm circulating primary heat transfer fluid 32. The vaporizer 13 is preferably a closed loop vaporizer using glycol and water combined as a primary heat transfer fluid for heat transfer to the vaporizer 13. There are numerous closed loop vaporizers well known in the art. The vaporized gas is either sent out over a gas pipe line to users or utilized to fuel a gas turbine 15 embedded in the combined cycle power plant.

The circulating primary heat transfer fluid can be glycol, methanol, ethanol, a glycol/water mixture or any other suitable heat transfer fluid, well known to a person who is skilled in the art. The circulating primary heat transfer fluid 32 is chilled to approximately 1° C. in vaporizer 13. The chilled primary heat transfer fluid is then used to cool the gas turbine inlet air by passing primary heat transfer fluid through a fin-tube type cooling coil 14 or any other well known air-heat exchanger device. The gas turbine inlet air temperature is controlled by modulating the amount of heat transfer fluid 32 sent to the cooling coil 14 by controlling the combination of the coil inlet valve 25 and by-pass valve 26. The primary heat transfer fluid exiting the gas turbine cooling coil is sent to a circulating water/heat transfer fluid (HTF) heat exchanger 16.

In circulating water/heat transfer fluid (HTF) heat exchanger 16, chilled primary heat transfer fluid 17 is heated by a secondary heat transfer fluid, warm circulating water 18. Secondary heat transfer fluid, circulating water 18 is circulated by a circulating water pump 19 and filtered by self cleaning strainer 20. The exiting secondary heat transfer fluid, circulating water 31 passes through circulating water/heat transfer fluid (HTF) heat exchanger 16 and returns to the circulating water return 30 for discharge. Seawater can be drawn from the sea, utilized as a secondary heat transfer fluid and discharged to return to the sea.

Cooling tower water can also be used as the circulating water or secondary heat transfer fluid. In the circulating water/heat transfer fluid (HTF) heat exchanger 16, the secondary heat transfer fluid is chilled and the primary heat transfer fluid is heated. The primary heat transfer fluid is heated to a desired temperature before it is returned to the cold liquid vaporizer via heat transfer fluid pump 24. The heat transfer fluid flow is modulated or controlled by controlling adjustment valves 27 and 28. Controllers for these valves, either hydraulic, pneumatic or electronic are well known in the art and are not shown in the figure for simplicity.

A liquid/gas separator 29 is used to separate any gases in the heat transfer fluid and vent the gases to the expansion gas tank 23. A heat transfer fluid fill tank 21 is provided to refill and makeup for any losses in heat transfer fluid which occur during the system operation. A pump 22 circulates the primary heat transfer fluid between the heat transfer fluid expansion tank 23 and the heat transfer fluid fill tank 21.

The primary function of a preferred embodiment of the present invention is to chill the gas turbine inlet air, however, the present invention also enables chilling steam turbine condenser cooling water which helps to create a lower vacuum pressure in the condenser. A lower condenser vacuum leads to a lower steam turbine backpressure and results in a higher steam turbine power output. This feature is especially useful when the ambient air temperature is lower than 45° F. (7.2° C.). At this temperature and lower, substantially all chill or cold energy recovered from the LNG vaporizer can be used to chill the condenser circulating water by manipulating control valves at cooling coil 14 and circulating water/heat transfer fluid (HTF) heat exchanger 16. Valve 25 to the gas turbine inlet air cooling coil 14 is closed and the by-pass valve 26 is fully open. The chilled primary heat transfer fluid will then enter circulating water/ HTF heat exchanger 16 through valve 27 and circulating water/heat transfer fluid (HTF) heat exchanger 16 path 17 to cool the circulating seawater in circulating water/heat transfer fluid (HTF) heat exchanger 16 path 18. Valve 28 will be closed during this operating mode.

Figure 2:
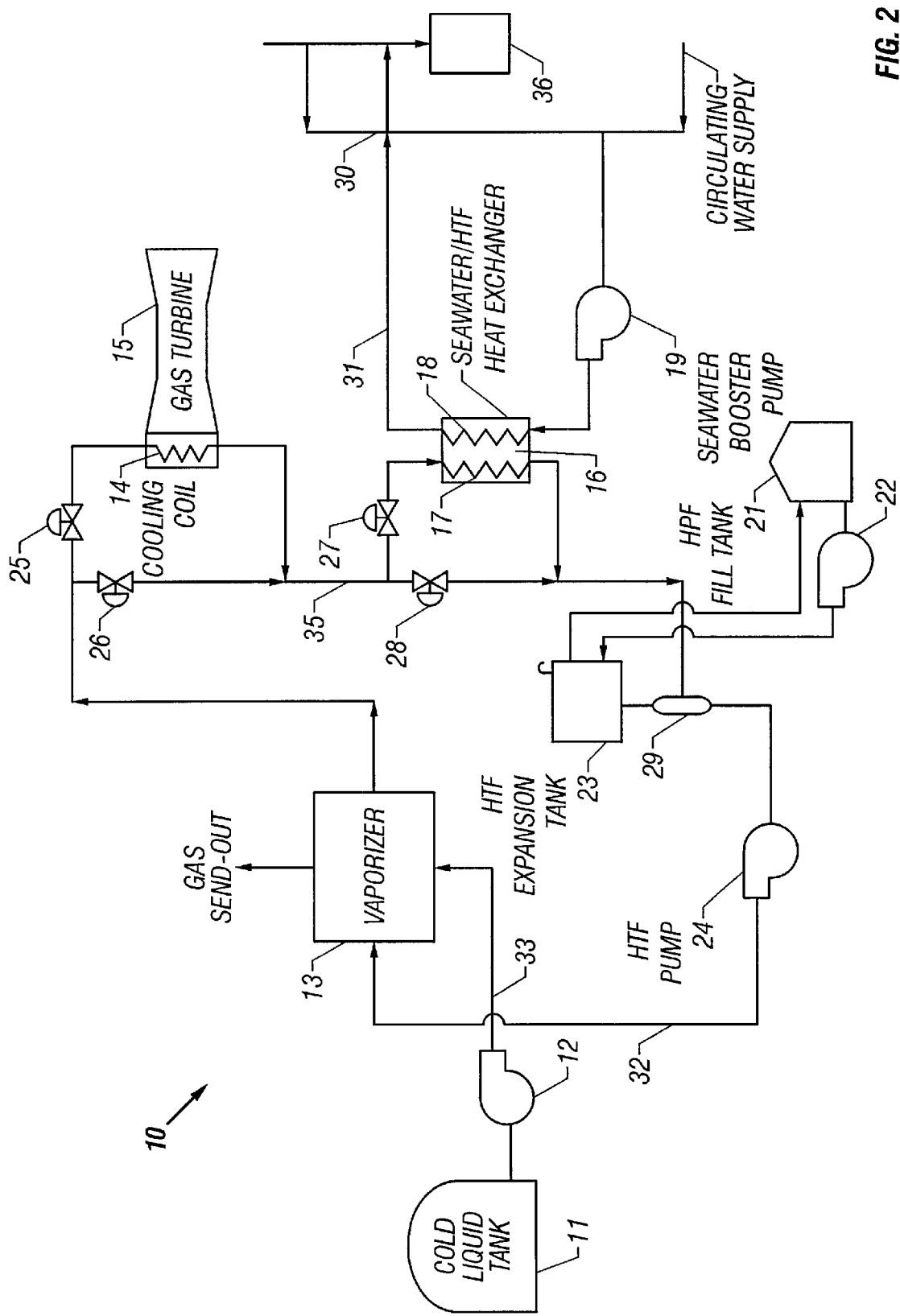
FIG. 2 is a block diagram of a combined cycle power generation plant in an alternative embodiment of the present invention.

Turning now to FIG. 2, an alternative embodiment of the present invention is shown. As shown in FIG. 2, a portion of circulating water secondary heat transfer fluid return 30 is pumped by pump 19 through circulating water/heat transfer fluid (HTF) heat exchanger 16 and discharge 31 is chilled and returned to cooling tower 36. As the temperature of discharge 31 is lower than the temperature of circulating water 30, the cooling of circulating water 30 in circulating water/heat transfer fluid (HTF) heat exchanger 16 reduces the load to cooling tower 36.

Figure 3:
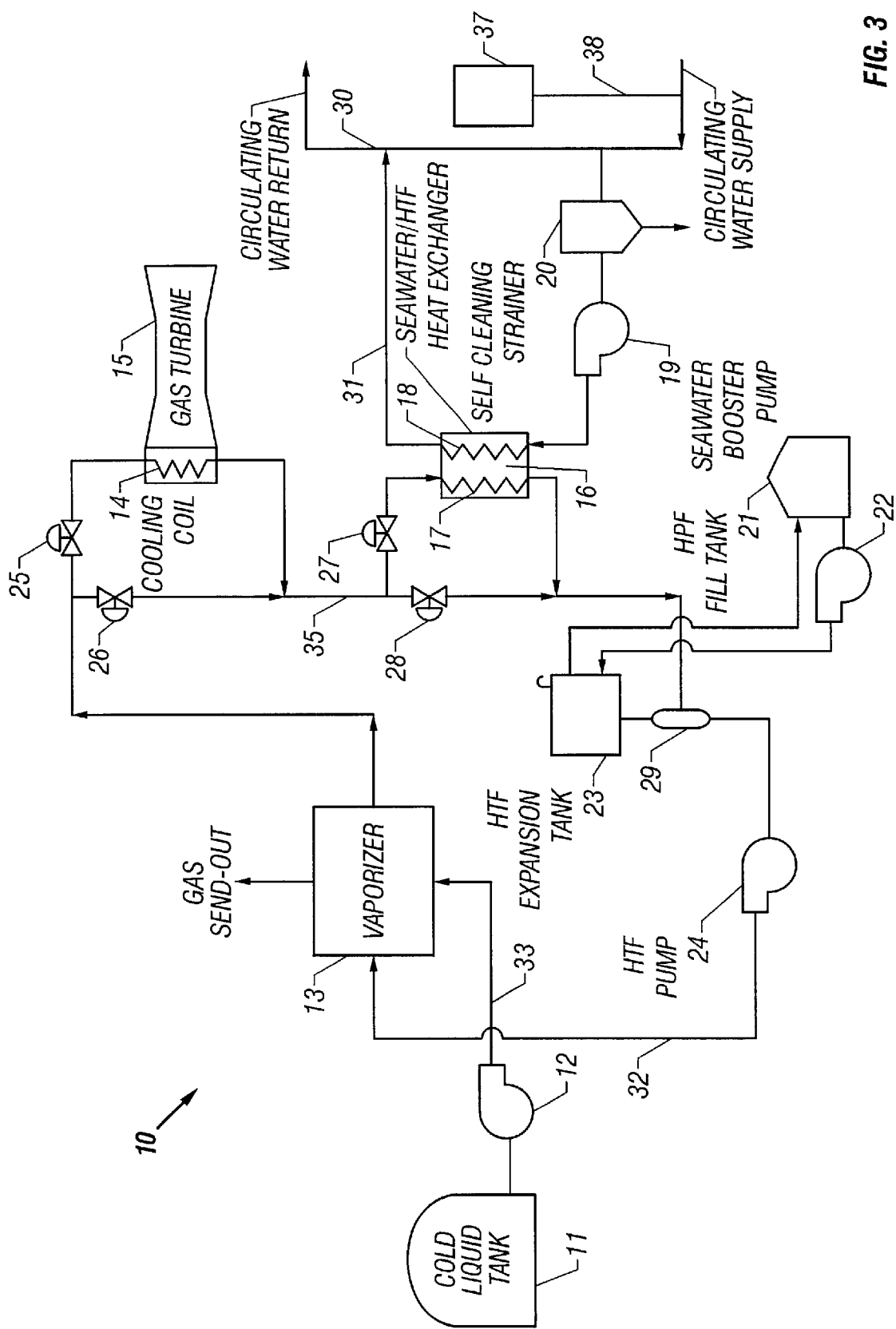
FIG. 3 is a block diagram of a combined cycle power generation plant in an alternative embodiment of the present invention.

Turning now to FIG. 3, another alternative embodiment of the present invention is shown. As shown in FIG. 3, a portion of condenser 37 discharge water 38 is pumped by pump 19 through circulating water/heat transfer fluid (HTF) heat exchanger 16. Discharge 31 is returned to circulating water return 30. This cooling of condenser discharge 37 adds heat to the heat transfer fluid 32 to assist LNG vaporization which reduces the heat released to the ocean return water without the necessity of adding an additional seawater pump to mix in cooler seawater from the sea. This alternative embodiment provides heat for LNG vaporization when the gas turbine is not operating or during the winter when ambient air is cold.

The foregoing description has been limited to specific embodiments of the invention. It will be apparent, however, that variations and modifications can be made to the invention, with the attainment of some or all of the advantages of the invention, while coming within the true spirit and scope of the invention.

What is claimed is:

1. A LNG/LPG combined cycle power plant comprising:
   a cold liquid storage tank for storing LNG/LPG;
   a cold liquid vaporizer for receiving LNG/LPG from the cold liquid storage tank and vaporizing LNG/LPG;
   a circulating primary heat transfer fluid for supplying heat to the LNG/LPG vaporizer to assist in vaporizing LNG/LPG wherein the heat transfer fluid is chilled;
   a gas turbine having a cooling coil wherein the cooling coil receives the chilled primary heat transfer fluid to increase the output and efficiency of the gas turbine; and
   a circulating water/heat transfer fluid (HTF) heat exchanger for receiving the primary heat transfer fluid from the gas turbine cooling coil and placing the primary heat transfer fluid in heat exchange relationship with a secondary heat transfer fluid wherein the primary heat transfer fluid is warmed and returns to the vaporizer.

2. The apparatus of claim 1 further comprising:
   a secondary heat transfer fluid pump for supplying a secondary heat transfer fluid to the circulating water/heat transfer fluid (HTF) heat exchanger.

3. The apparatus of claim 1 wherein the secondary heat transfer fluid comprises seawater provided from a seawater supply to the circulating water/heat transfer fluid (HTF) heat exchanger where it is chilled and returned from the circulating water/heat transfer fluid (HTF) heat exchanger to a circulating seawater return for at least one of continued circulation or discharge to the sea.

4. The apparatus of claim 1 wherein the secondary heat transfer fluid comprises water from a circulating water supply wherein the secondary heat transfer fluid is chilled and returned from the circulating water/heat transfer fluid (HTF) heat exchanger to a cooling tower to reduce the duty cycle of the cooling tower.

5. The apparatus of claim 1 wherein the secondary heat transfer fluid comprises water from a circulating water supply wherein the secondary heat transfer fluid is chilled and returned from the circulating water/heat transfer fluid (HTF) heat exchanger to cooling tower.

6. The apparatus of claim 1 wherein the secondary heat transfer fluid comprises water provided from a condenser discharge to the circulating water/heat transfer fluid (HTF) heat exchanger and returned to a circulating water return.

7. The apparatus of claim 1 further comprising a primary heat transfer fluid fill tank to replace primary heat transfer fluid lost during circulation within the apparatus.

8. The apparatus of claim 7 further comprising a liquid and gas separator for separating gas and liquid from the primary heat transfer fluid.

9. The apparatus of claim 1 wherein the primary heat transfer fluid comprises a water glycol combination.

10. A method for producing power in a LNG/LPG combined cycle power plant comprising the steps for:
    storing LNG/LPG;
    vaporizing LNG/LPG;
    circulating a primary heat transfer fluid for supplying heat to the LNG/LPG vaporizer to assist in vaporizing LNG/LPG wherein the primary heat transfer fluid is chilled; and
    circulating the primary heat transfer fluid to chill input air to a gas turbine to increase the output and efficiency of the gas turbine;
    receiving the primary heat transfer fluid from the gas turbine cooling coil and placing the primary heat transfer fluid in heat exchange relationship with a secondary heat transfer fluid wherein the primary heat transfer fluid is warmed and returns to the vaporizer.

11. The method of claim 10 further comprising the step for:
    supplying a secondary heat transfer fluid to the circulating water/heat transfer fluid (HTF) heat exchanger.

12. The method of claim 10 wherein the secondary heat transfer fluid comprises seawater provided from a seawater supply to the circulating water/heat transfer fluid (HTF) heat exchanger where the seawater is chilled and returned from the circulating water/heat transfer fluid (HTF) heat exchanger to a circulating seawater return for at least one of the following: continued circulation or discharge to the sea.

13. The method of claim 10 wherein the secondary heat transfer fluid comprises water from a circulating water supply further comprising the step for: chilling the secondary heat transfer fluid and returning the secondary heat transfer fluid to a cooling tower to reduce the duty cycle of the cooling tower.

14. The method of claim 10 further comprising the steps for:
    providing the secondary heat transfer fluid from a circulating water supply wherein the secondary heat transfer fluid is chilled and returned to a cooling tower.

15. The method of claim 10 further comprising the steps for:
    providing the secondary heat transfer fluid from a condenser discharge to the circulating water/heat transfer fluid (HTF) heat exchanger and returning the secondary heat transfer fluid to a circulating water return.

16. The apparatus of claim 10 further comprising a primary heat transfer fluid fill tank to replace primary heat transfer fluid lost during circulation within the apparatus.

17. The method of claim 16 further the steps for:

separating gas and liquid from the primary heat transfer fluid.

18. The method of claim 10 further wherein the primary heat transfer fluid comprises a water glycol combination.

19. The apparatus of claim 6 further comprising a set of valves enabling routing of the primary heat transfer fluid so that the primary heat transfer fluid bypasses the gas turbine so that substantially all cold energy in the primary heat transfer fluid is transferred to the condenser discharge in the circulating water/heat transfer fluid (HTF) heat exchanger.

\* \* \* \* \*